US007012220B2

(12) United States Patent
Boyer et al.

(10) Patent No.: US 7,012,220 B2
(45) Date of Patent: Mar. 14, 2006

(54) ALPHA-NUMERIC DATA ENTRY AND DISPLAY FOR ELECTRONIC OVEN CONTROL SYSTEM

(75) Inventors: Mark A. Boyer, Harrison, TN (US); Jill L. Means, Des Moines, IA (US)

(73) Assignee: Maytag Corp., Newton, IA (US)

(*) Notice: Subject to any disclaimer, the term of this patent is extended or adjusted under 35 U.S.C. 154(b) by 75 days.

(21) Appl. No.: 10/410,138

(22) Filed: Apr. 10, 2003

(65) Prior Publication Data

US 2004/0200824 A1 Oct. 14, 2004

(51) Int. Cl.
*A21B 1/00* (2006.01)

(52) U.S. Cl. ...................... 219/411; 219/412; 219/400; 219/506; 219/494; 219/501; 219/497; 219/395; 99/325; 99/326; 99/327; 99/328; 99/329; 99/330; 99/331

(58) Field of Classification Search ........ 219/411–415, 219/400, 506, 494, 501, 505, 497, 492, 395; 99/325–331
See application file for complete search history.

(56) References Cited

U.S. PATENT DOCUMENTS

| | | | |
|---|---|---|---|
| 4,341,197 A | | 7/1982 | Butts |
| 4,454,501 A | | 6/1984 | Butts |
| 4,647,746 A | * | 3/1987 | Eke ............................ 219/681 |
| 5,528,235 A | * | 6/1996 | Lin et al. ....................... 341/22 |
| 6,043,760 A | | 3/2000 | Laakkonen |
| 6,130,628 A | | 10/2000 | Schneider-Hufschmidt et al. |
| 6,137,426 A | | 10/2000 | Roth |
| 6,255,630 B1 | | 7/2001 | Barnes et al. |
| 6,486,453 B1 | * | 11/2002 | Bales et al. ................. 219/702 |
| 2002/0027549 A1 | | 3/2002 | Hirshberg |
| 2002/0136371 A1 | | 9/2002 | Bozorgui-Nesbat |

FOREIGN PATENT DOCUMENTS

| | | |
|---|---|---|
| JP | 6221567 | 8/1994 |
| JP | 266347 | 9/2000 |

* cited by examiner

*Primary Examiner*—Shawntina Fuqua
(74) *Attorney, Agent, or Firm*—Diederiks & Whitelaw, PLC

(57) ABSTRACT

A cooking appliance employing rapid cook technology includes an electronic oven control system employing an alpha-numeric data entry and display arrangement. The cooking appliance includes a display which incorporates a series of vertically spaced information display zones, with each of the zones being capable of displaying both alpha and numeric data to a user of the appliance. Text and numeric data can be entered by the user through a ten-digit keypad provided on a control panel of the appliance. Each labeled numeric key (0–9) can be used to input a corresponding numeric data symbol, as well as additional text information. This arrangement advantageously makes purchasing and operating a sophisticated cooking appliance more appealing and less intimidating to a consumer.

17 Claims, 2 Drawing Sheets

ALPHA-NUMERIC DATA ENTRY AND DISPLAY FOR ELECTRONIC OVEN CONTROL SYSTEM

BACKGROUND OF THE INVENTION

1. Field of the Invention

The present invention pertains to the art of cooking appliances and, more particularly, to a data entry system enabling alpha-numeric inputs into an electronic control system of a cooking appliance.

2. Discussion of the Prior Art

The art of cooking is currently undergoing substantial change. It is no longer the norm to have a family member home all day with time to cook and prepare meals. Today, more and more consumers must rush home from work to prepare meals for themselves or for their families. In today's fast paced society, time is of the essence. The luxury of spending time in preparing a meal is becoming less and less affordable. As such, consumers demand an oven that will cook a meal in less time than conventional ovens, without sacrificing the quality of the prepared food. In order to meet these demands, manufacturers are combining conventional radiant cooking systems with the rapid cook advantages of convection, microwave, and other types of cooking systems.

Of course, when making a wide range of cooking options available to a consumer in a particular cooking appliance, the complexity of operation will certainly increase. To counteract this inherent situation, electronic control units are being made more sophisticated to aid a user in selecting desired operations. For instance, it has been heretofore proposed to provide a visual display which can convey programming and operational information to a user in alpha-numeric formats. With such an arrangement, the control unit can basically walk a user through a programming sequence and also convey a wide range of messages to the user. Given the level of technology employed in such advanced cooking systems, it is also possible for the user to customize, at least to a certain degree, the cooking appliance. For instance, it is possible to enable favorite recipes or cooking sequences to be saved in memory and reproduced when desired.

Regardless of the potential use of these advanced operation, programming and display functions, it must be kept in mind that cooking appliance has a relatively small amount of space available for a display and control elements. Certainly, the availability and consumer appeal of providing an abundance of information or control features can depend upon enhancing design features of the overall control system. For instance, the manner in which information is inputted and/or displayed to a user can have a significant effect on the overall consumer satisfaction and commercial viability of a cooking appliance, particularly a cooking appliance employing both conventional and rapid cook technologies.

Based on the above, there exists a need in the art for a versatile cooking appliance that is capable of providing a wide range of cooking operations, yet presents a compactly designed control arrangement that enables both the inputting and displaying of a wide range of alpha-numeric data for control and information purposes.

SUMMARY OF THE INVENTION

The present invention is directed to a cooking appliance including an electronic oven control system employing an alpha-numeric data entry and display arrangement. In accordance with a preferred embodiment of the invention, the cooking appliance includes a display which incorporates a series of vertically spaced information display zones, with each of the zones being capable of displaying both alpha and numeric data to a user of the appliance. In addition, text and numeric data can be entered by the user through a ten-digit keypad provided on a control panel of the appliance. Each labeled numeric key (0–9) can be used to input a corresponding numeric data symbol, as well as additional text information.

More specifically, in accordance with the most preferred form of the invention, each of the number keys 2–9 can also be used to enter alpha text, while the number key 0 can be used to enter a space, and the number one key can provide a "–". To enter text, the user will press the appropriate numeric key that has the desired letter assigned to it. Each time the user presses a particular key, the display on the control will cycle through each of the letters associated with that number key. After the desired letter or number is selected, the user will press an enter key. This will cause the control to increment to the next text position on the display. If no key is activated for a predetermined time period after a prior key selection, the control will automatically enter the desired character and increment to the next text position. A final enter key activation or a significant programming delay will signify that all the desired text has been inputted.

With this arrangement, a compact data entry and display arrangement can be employed in a cooking appliance to enable a user to easily operate and personally program the appliance. Again, the need for such an arrangement is considered to be particularly relevant in connection with a cooking appliance employing both conventional radiant and rapid cook technologies. These types of appliances are relatively new to the industry and consumers, while becoming increasingly complex. Therefore, the invention can make purchasing and operating such a cooking appliance less intimidating to the consumer. In any case, additional objects, features and advantages of the present invention will become more readily apparent from the following detailed description of a preferred embodiment when taken in conjunction with the drawings wherein like reference numerals refer to corresponding parts in the several views.

DETAILED DESCRIPTION OF THE PREFERRED EMBODIMENT

Figure 1:
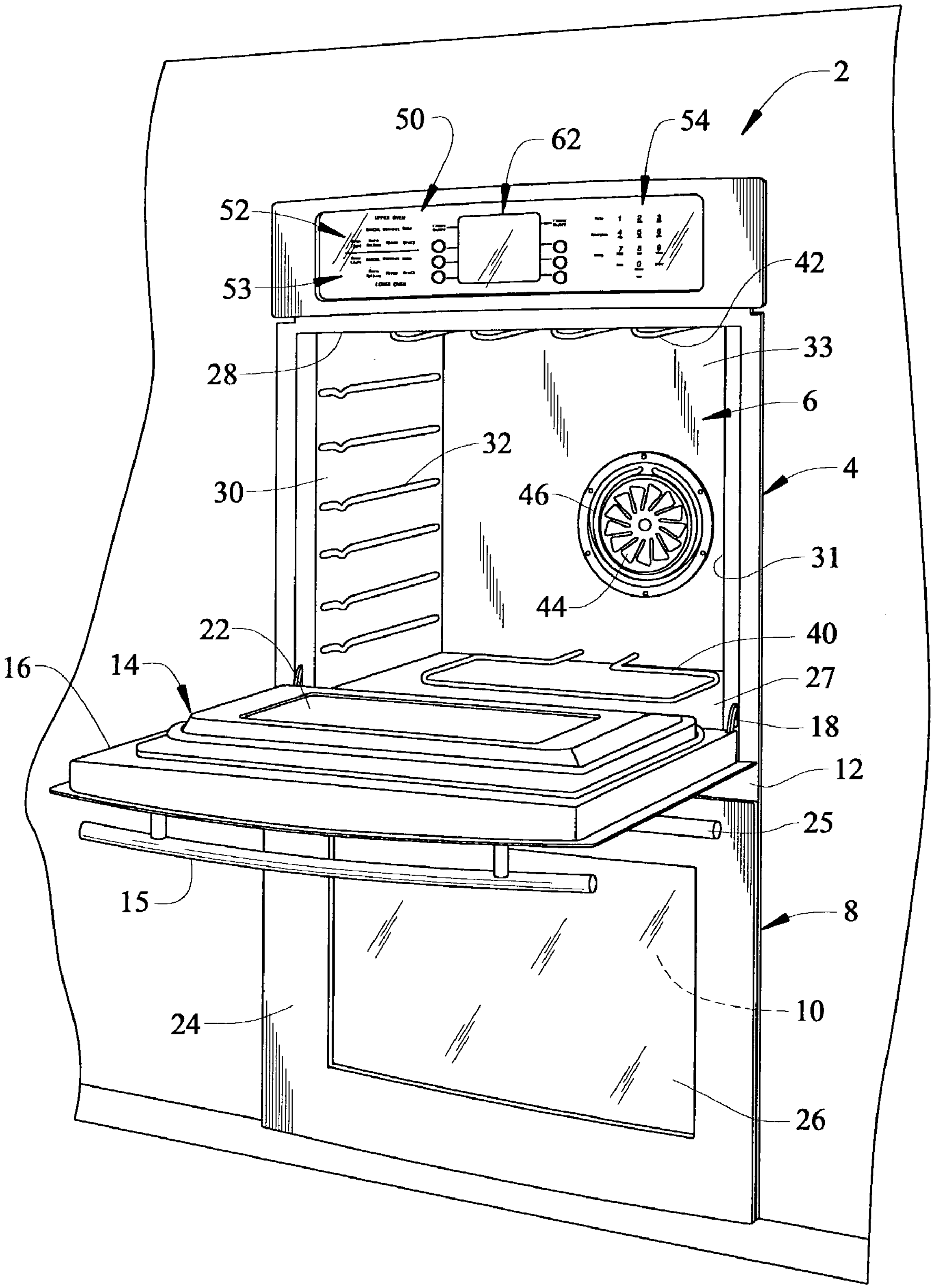
FIG. 1 is a perspective view of a wall oven constructed in accordance with the present invention.

With initial reference to FIG. 1, a cooking appliance constructed in accordance with the present invention is generally indicated at 2. Cooking appliance 2, as depicted, constitutes a double wall oven. However, it should be understood that the present invention is not limited to this model type and can be incorporated into various types of oven configurations, e.g., cabinet mounted ovens, as well as both slide-in and free standing ranges. In any event, in the embodiment shown, cooking appliance 2 constitutes a dual oven wall unit including an upper oven 4 having upper oven cavity 6 and a lower oven 8 having a lower oven cavity 10. Cooking appliance 2 includes an outer frame 12 for supporting both upper and lower oven cavities 6 and 10.

In a manner known in the art, a door assembly 14 is provided to selectively provide access to upper oven cavity 6. As shown, door assembly 14 includes a handle 15 at an upper portion 16 thereof. Door assembly 14 is adapted to pivot at a lower portion 18 to enable selective access to within oven cavity 6. In a manner also known in the art, door 14 is provided with a transparent zone or window 22 for viewing the contents of oven cavity 6 while door 14 is closed. A corresponding door assembly 24 including a handle 25 and a transparent zone or window 26 is provided to selectively access lower oven cavity 10.

As best seen in FIG. 1, oven cavity 6 is defined by a bottom wall 27, an upper wall 28, opposing side walls 30 and 31 provided with a plurality of vertically spaced side rails 32, and a rear wall 33. In the preferred embodiment shown, bottom wall 27 is constituted by a flat, smooth surface designed to improve the cleanability of oven cavity 6. Arranged about bottom wall 27 of oven cavity 6 is a bake element 40. Also, a top broiler element 42 is arranged along upper wall 28 of oven cavity 6. Top broiler element 42 is provided to enable a consumer to perform a grilling process in upper oven 4 and to aid in pyrolytic heating during a self-clean operation. In the preferred form of the invention shown, both bake element 40 and top broiler element 42 are constituted by sheathed electric resistive heating elements.

Based on the above, in the preferred embodiment depicted, cooking appliance 2 actually constitutes an electric, dual wall oven. However, it is to be understood that cooking appliance 2 could equally operate on gas, either natural or propane. In any case, both oven cavities 6 and 10 preferably employ both radiant and convection heating techniques for cooking food items therein. To this end, rear wall 33 is shown to include a convection fan or blower 44. Although the exact position and construction of fan 44 can readily vary in accordance with the invention, in accordance with the most preferred form of the invention, fan 44 draws in air at a central intake zone (not separately labeled) and directs the air into oven cavity 6 in a radial outward direction. Also as clearly shown in this figure, another sheathed electric heating element 46, which preferably takes the general form of a ring, extends circumferentially about fan 44 in order to heat the radially expelled air flow. At this point, it should be noted that a fan cover, which has not been shown for the sake of clarity of the drawings, extends about fan 44 and heating element 46, preferably with the cover having an associated central inlet opening and a plurality of outer radial outlet openings.

Figure 2:
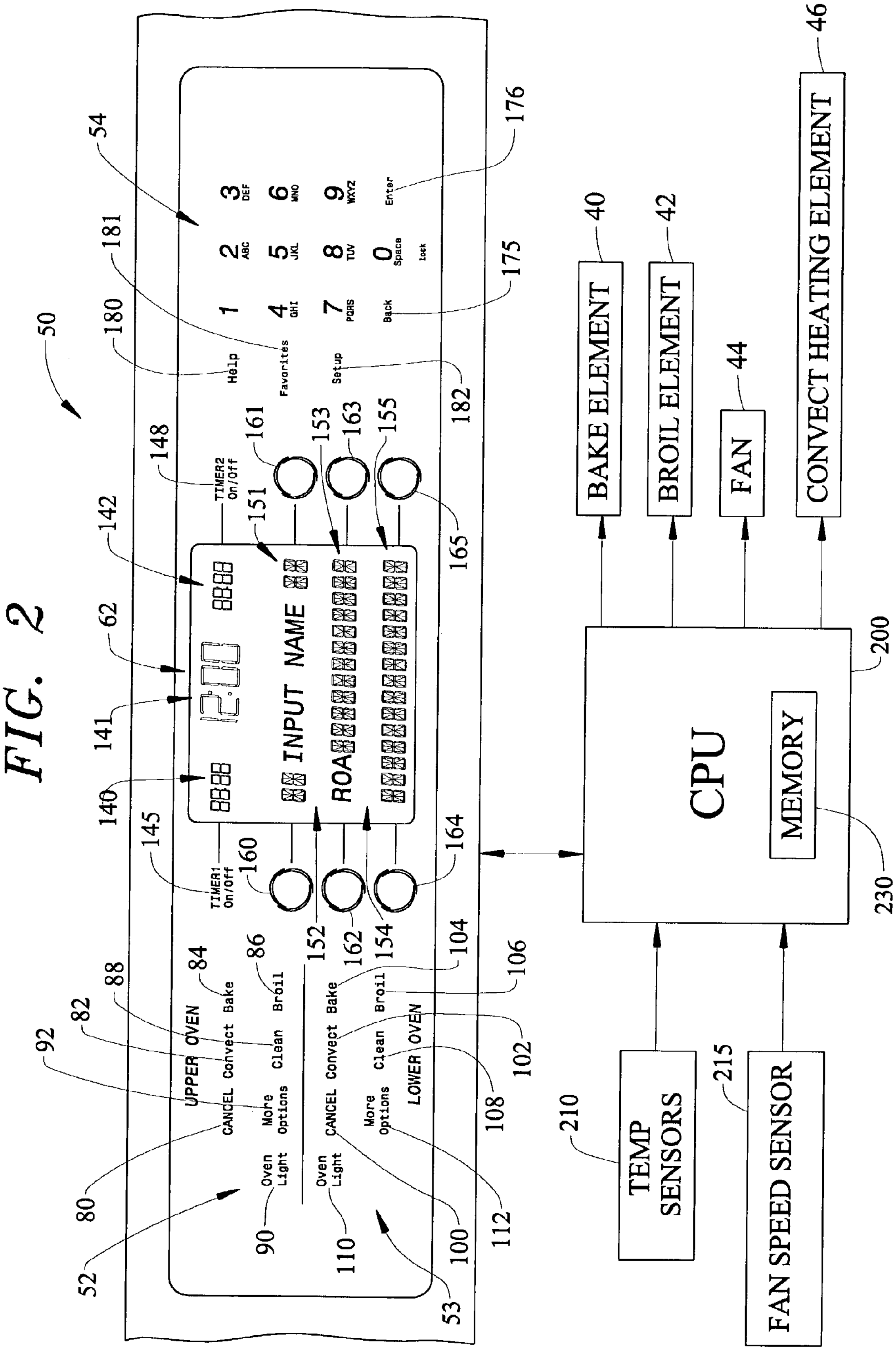
FIG. 2 is an enlarged view of a control panel employed in connection with the wall oven of FIG. 1.

As further shown in FIGS. 1 and 2, cooking appliance 2 includes an upper control panel 50 having a plurality of control elements. In accordance with one embodiment, the control elements are constituted by first and second sets of oven control buttons 52 and 53, as well as a numeric pad 54. Control panel 50 is adapted to be used to input desired cooking parameters for cooking appliance 2. More specifically, the first and second sets of control buttons 52 and 53, in combination with numeric pad 54 and a display 62, enable a user to establish particular cooking operations for upper and lower ovens 4 and 8 respectively.

In the preferred embodiment particularly shown in FIG. 2, first set of control buttons 52 includes a cancel button 80, a convection button 82, a bake button 84, a broil button 86, and a clean button 88. In addition, first set of control buttons 52 also preferably includes an oven light button 90 and a button 92 used to access more cooking options which are conveyed to the user through display 62. In a corresponding manner, second set of control buttons 52 includes a cancel button 100, a convection button 102, a bake button 104, a broil button 106, and a clean button 108. Furthermore, second set of control buttons 53 also preferably includes an oven light button 110 and a button 112 which is used to access more cooking options that are conveyed to the user through display 62.

To this end, display 62 is preferably divided into various sections. In accordance with the most preferred embodiment of the invention, an uppermost section of display 62 is sub-divided into three time display zones 140–142. More specifically, leftmost display zone 140 constitutes a first timer zone having an associated timer button 145. Central display zone 141 constitutes a clock for cooking appliance 2. Rightmost display zone 142 constitutes a second timer zone having an associated timer button 148. Spaced below time display zones 140–142 are a series of vertically spaced information display zones 151–155. Each of information display zones 151, 153 and 155 has associated left and right portions (not separately labeled). Each of the left and right portions have associated therewith laterally positioned selection buttons 160–165.

As shown, numeric pad 54 preferably enables alpha-numeric input. That is, in addition to presenting numbers 0–9, numeric pad 54 doubles as an input source for alpha information. To this end, the number 2 button functions for ABC letter entry; the number 3 button functions for DEF letter entry; the number 4 button functions for GHI letter entry; the number 5 button functions for JKL letter entry; the number 6 button functions for MNO letter entry; the number 7 button functions for PQRS letter entry; the number 8 button functions for TUV letter entry; and the number 9 button functions for WXYZ letter entry. The number 0 button can also be used to input a space. Furthermore, the number 1 button can be used to input a dash (-) between alpha or alpha-numeric characters. On either side of the number 0 button are Back and Enter buttons 175 and 176 which can be used in combination with the various alpha keys for information entry as will be detailed more fully below. Finally, provided adjacent numeric pad 54 are Help, Favorites and Setup buttons 180–182.

In general, control panel 50 is linked to a controller or CPU 200 formed as part of cooking appliance 2. Therefore, CPU 200 receives user inputs and selections through control panel 50, as well as signals from sensors associated with cooking appliance 2, i.e. oven temperature sensors for upper and lower ovens 4 and 8 as generally indicated at 210 and a fan speed sensor 215. In turn, CPU 200 controls bake element 40, top broiler element 42, convection fan 44 and convection heating element 46. The overall manner in which CPU 200 controls individual components of cooking appliance 2 does not form part of the present invention and therefore will not be discussed further here. Instead, the present invention is particularly directed to the programming and displaying of alpha-numeric data in cooking appliance 2.

As indicated above, each of the number keys 2–9 can also be used to enter alpha text, while the number key 0 can be used to enter a space, and the number one key can provide a "–". To enter text, the user will press the appropriate key in numeric pad 54 that has the desired letter assigned to it. Each time the user presses a particular key (2–9), display 62 on control panel 50 will move within the cycle of letters associated with that number key. After the desired letter or number is selected, the user will press the enter key 176. This will cause CPU 200 to increment to the next text position on display 62, particularly one of information display zones 151, 153 or 155. If no key is activated for a predetermined time period after a prior key selection, with this time period being preferably in the order of 3 seconds in accordance with the preferred embodiment, CPU 200 will automatically enter the desired character and increment to the next text position. A final depression of enter key 176 or a significant programming delay will signify that all the desired text has been inputted.

With this arrangement, a compact data entry and display arrangement is employed to enable a user to operate and personally program cooking appliance 2. This data entry and display arrangement can be particularly advantageous in connection with inputting information concerning favorite recipes through the use of button 181, wherein cooking appliance 2 can receive cooking instructions from a user and store the same in memory 230 of CPU 200 for later access. In accordance with the invention, the user can designate a particular name, as well as time and temperature parameters, to a certain favorite recipe. The user can later select that specific set of cooking instructions by having the stored favorite recipes displayed through information display zones 151–155 and making a desired choice through selection buttons 160–165. In addition, it is contemplated that display 62 and numeric pad 54 can be used in accordance with the invention for inputting and displaying a host of information, including messages, instructional statements and other storage and retrieval data. In any case, it should be readily apparent that display 62 is designed to enable a rather large amount of alpha-numeric information to be conveyed to a user which is considered important in connection with the many available options for cooking appliance 2. In addition, the compact configuration and simplicity of operation of the user programmable alpha-numeric data for storage and display purposes in accordance with the invention further enhances the display capabilities and presents an attractive, overall cooking appliance 2 for the consumer.

Although described with reference to a preferred embodiment of the invention, it should be readily understood that various changes and/or modifications can be made to the invention without departing from the spirit thereof. In general, the invention is only intended to be limited by the scope of the following claims.

We claim:

1. A cooking appliance comprising:

an oven cavity;

at least one radiant heating element arranged for producing radiant heat in the oven cavity;

a rapid cook heating source;

a control panel for both selecting a desired cooking operation for the oven cavity and inputting parameters for the desired cooking operation, said control panel including a display and a numeric pad, said display including a plurality of information display zones capable of displaying alpha-numeric data, said numeric pad including a plurality of number key zones, at least a majority of the number key zones providing dual data input functions of inputting both numeric and alpha data; and means for receiving numeric and alpha data through the numeric pad and displaying the data in at least one of the plurality of information display zones.

2. The cooking appliance according to claim 1, wherein the plurality of number key zones of said numeric pad encompasses numbers 0–9 and letters of the alphabet.

3. The cooking appliance according to claim 2, wherein the plurality of number key zones of said numeric pad provide for the input of spaces between words in the display.

4. The cooking appliance according to claim 3, wherein the plurality of number key zones of said numeric pad provide for the input of dashes in the display.

5. The cooking appliance according to claim 1, wherein each of the majority of the plurality of number key zones provides for the sequential input of one number and multiple letters.

6. The cooking appliance according to claim 5, wherein each of the majority of the plurality of number key zones enables a user to select from the one number and multiple letters in dependence on a number of times said each of the majority of the plurality of number key zones is consecutively selected.

7. The cooking appliance according to claim 6, wherein the control panel further includes a key for entering a desired one of the one number and multiple letters.

8. The cooking appliance according to claim 7, wherein the control panel further includes a key for use in storing information concerning favorite cooking operations, in combination with the numeric pad.

9. The cooking appliance according to claim 1, wherein the rapid cook heating source includes a convection fan and a convection heating element.

10. The cooking appliance according to claim 9, wherein the cooking appliance constitutes a dual wall oven.

11. A method of inputting and displaying data in a cooking appliance employing both radiant and rapid cook heating sources comprising:

A) pressing a numeric key, selected from a plurality of numeric keys provided on a control panel of the cooking appliance, a number of times;

B) presenting in a display, provided on the control panel, either a numeric or an alpha data element depending on the number of times the numeric key is pressed;

C) fixing the numeric or alpha data element in position in the display;

D) incrementing to another position of the display;

E) repeating steps A–D a desired number of times to complete data entry;

F) storing the data in a memory; and

G) subsequently selecting a cooking operation for the cooking appliance based on the data stored in the memory.

12. The method of claim 11, wherein step C is performed by pressing an enter key provided on the control panel.

13. The method of claim 11, wherein steps C and D are performed automatically following a predetermined period following step A.

14. The method of claim 13, wherein step F is performed automatically following a predetermined period following step D.

15. The method of claim 11, further comprising: pressing another number key to input a space into the display.

16. The method of claim 11, further comprising: pressing another number key to input a dash (–) into the display.

17. The method of claim 11, further comprising: the numeric and/or alpha data elements in a plurality of vertically spaced information display zones in the display.

* * * * *